United States Patent [19]

Schrade

[11] Patent Number: 4,853,608
[45] Date of Patent: Aug. 1, 1989

[54] AC VOLTAGE REGULATOR

[76] Inventor: Chester Schrade, 139 Walnut Street, Winnipeg, Manitoba, Canada, R3G 1P2

[21] Appl. No.: 78,197

[22] Filed: Jul. 27, 1987

[51] Int. Cl.⁴ .......................... G05F 1/20; H02H 7/055
[52] U.S. Cl. .................................... 323/258; 323/343; 361/18; 361/111
[58] Field of Search .................. 363/43; 323/256–258, 323/340–343, 259, 344; 361/2, 3–7, 18, 93, 111

[56] References Cited

U.S. PATENT DOCUMENTS

| | | | |
|---|---|---|---|
| 2,063,693 | 12/1936 | McCarty | 323/259 |
| 3,199,020 | 8/1965 | Hilker | 323/259 |
| 3,725,771 | 4/1973 | Gilmore | 323/258 X |
| 3,908,163 | 9/1975 | Gilmore | 323/251 |
| 3,913,007 | 10/1975 | Gilmore | 323/257 |
| 4,090,225 | 5/1978 | Gilker et al. | 361/5 X |
| 4,201,938 | 5/1980 | Neumann | 323/343 |
| 4,331,994 | 5/1982 | Wirth | 361/56 |
| 4,363,060 | 12/1982 | Stich | 323/343 X |
| 4,377,832 | 3/1983 | Toney et al. | 361/56 |
| 4,454,466 | 6/1984 | Ritter | 323/258 |
| 4,622,513 | 11/1986 | Stich | 323/343 |
| 4,623,834 | 11/1986 | Klingbiel et al. | 323/258 |

FOREIGN PATENT DOCUMENTS

| | | | |
|---|---|---|---|
| 265910 | 7/1929 | Italy | 323/344 |
| 905801 | 6/1978 | U.S.S.R. | |
| 0705617 | 12/1979 | U.S.S.R. | 323/344 |
| 497653 | 12/1938 | United Kingdom | 323/344 |
| 2125194 | 2/1984 | United Kingdom | 323/258 |

OTHER PUBLICATIONS

"AC-Operated Power Supplies", 1979, The Radio Amateur's Handbook, Published by the American Radio Relay League, pp. 5–2.

Primary Examiner—Patrick R. Salce
Assistant Examiner—Emanuel Todd
Attorney, Agent, or Firm—Adrian D. Battison; Stanley G. Ade

[57] ABSTRACT

An AC voltage regulator includes a transformer arrangement having a plurality of taps so that an input line voltage is passed to an output line with the output line voltage being determined by the nominal value of the input line voltage together with an amount contributed by the transformer. The device is switched by a network of relays one of which acts as a polarity reversal switch so that the voltage generated by the transformer is either added or subtracted to the nominal voltage. Further relays used in two series control the selection of the transformer tap. A transient suppression circuit uses a triac and resistor to communicate current from the input line to the output line with the triac gated into conduction on breaking of a relay contact. The input line voltage is measured by a comparator using a plurality of op-amps in series with the outputs therefrom passing through a logic circuit to control the relays.

18 Claims, 4 Drawing Sheets

AC VOLTAGE REGULATOR

BACKGROUND OF THE INVENTION

This invention relates to an AC voltage regulator and particularly, but not exclusively, to a regulator which can be used to maintain within predetermined limits the voltage supplied to various equipment from the conventional mains supply.

In various regions, the voltage of the mains supply can vary significantly since the generators used to supply the voltage are in many cases not sufficiently large to avoid sudden drops and surges by averaging out over large numbers the connection and disconnection of various loads from the supply. These variations which can lie between about 85 volts and 140 volts on the nominal 115 volt supply have disastrous results on sensitive equipment.

Various devices are available for regulating voltage for this purpose but they tend to be complex and expensive and have a number of significant disadvantages.

SUMMARY OF THE INVENTION

It is one object of the invention, therefore, to provide an improved voltage regulator which is inexpensive to manufacture and which provides effective voltage regulation.

According to a first aspect of the invention, therefore, there is provided an AC voltage regulator comprising means for connection to an input line, means for connection to an output line, a transformer arrangement for generating a voltage on said output line which can differ from a voltage on said input line, said transformer arrangement having a plurality of taps which are selectable to change said voltage, means for sensing the magnitude of the voltage of the input line, relay actuated switching means for selecting one of said taps in dependence upon said sensed magnitude so as to tend to maintain the voltage on said output line within predetermined limits while said voltage on said input line varies, and transient suppression means providing a circuit connection between said input and output line by-passing said switching means and said transformer arrangement to maintain a current path during said selecting.

According to a second aspect of the invention there is provided an AC voltage regulator comprising means for connection to an input line, means for connection to an output line, a transformer arrangement for generating a voltage on said output line which can differ from a voltage on said input line, said transformer arrangement having a plurality of taps, relay switching means including a relay actuated polarity reversal switch arranged such that a voltage generated by said transformer arrangement at said output line can be in a first position of the switch added to and in a second position of the switch subtracted from a nominal voltage at said output line generated from said input line, a first relay actuated switch having a first terminal thereof connected to a first tap and a second terminal thereof connected to a second tap, a second relay actuated switch having a first terminal thereof connected to a third tap and a second terminal thereof connected to a fourth tap, a third relay actuated switch having a first terminal connected to said first switch and a second terminal connected to said second switch whereby selected actuation of said first, second and third switches is arranged to select one of second, third and fourth taps, means for sensing a magnitude of a voltage and for actuating said relay actuated switches in dependence upon said sensed magnitude so as to tend to maintain said output voltage within predetermined limits while said input voltage varies.

A device of this type has the advantages that: firstly it provides very low internal impedance which allows the device to deliver large surge currents; secondly, it can tolerate wide line frequency variation; thirdly it will accept any load power factor. In addition the device has the advantage that it does not in any way distort the power wave form or produce transients which can interfere with equipment which requires the conventional wave form.

The use of the relay switches to step from one tap to another of the transformer or transformers can most preferably be assisted by the provision of the transient suppression circuit so that it is not necessary to time the relays so that they operate simultaneously to avoid any periods of disconnection of the load from the input line.

Such transient suppression can particularly effectively be provided by a triac which can be switched on and off to provide the by-pass circuit either when the rate of increase of difference between the input and output exceeds a predetermined maximum or when the absolute value of the difference exceeds a predetermined maximum. The triac can automatically switch off when the triggering circuit is no longer activated and when the current through the triac drops to zero. This automatically switches in the transient suppression and switches it out again when it is no longer required after the switching of the relay is complete.

In accordance with a further preferred feature of the invention, the relay actuated switches are set up in a network including a polarity reversing switch which adds or subtracts the transformer voltage to or from the input line voltage to generate the load voltage. In addition the relay network can include a first relay which switches between a second pair of relays each of which switches to a respective pair of taps on the transformer or transformers.

In accordance with a further preferred feature of the invention, the operation of the relay network can be achieved using a logic circuit actuated by a comparator circuit. The comparator circuit develops a reference voltage which is connected in series in graduated descending steps to one input terminal of each of a number of operational amplifiers. A voltage proportional to the line voltage is developed and connected to the other input terminal of the amplifiers. A comparison is thus made generating an output at a number of the amplifiers dependent upon the magnitude of the proportional voltage.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
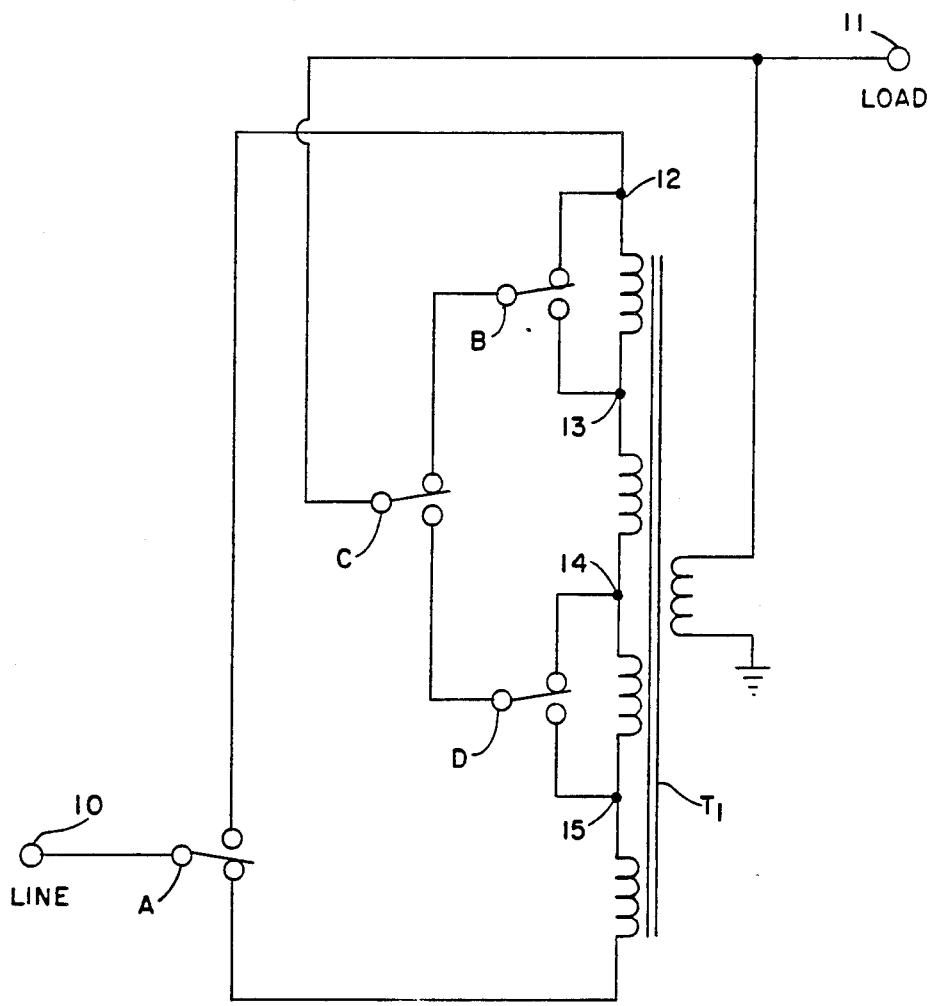
FIG. 1 is a schematic circuit illustration showing a first portion of a voltage regulator according to the invention and particularly the relay switching network and transformers which generate the load voltage from the input line voltage.

Turning firstly to FIG. 1, a terminal connected to the input line is indicated at 10 and a terminal connected to the output line connected to the load is indicated at 11. It will of course be appreciated that the input line is connected to a source of AC voltage and generally a variable source for example supplied by hard wire from a remote generator. The voltage at the output line 11 is generated by direct communication with the input line 10 and by the voltage generated across a pair of transformers T1 and T2. The transformers include a plurality of taps 12, 13, 14 and 15 on the primary which can be used to adjust the voltage generated in the secondary on the load side of the transformers. The connection from the input line to the various taps is controlled by a network of relay actuated switches A, B, C and D.

The switches A, B, C and D are shown in their deenergized state and in that state current passes from the input line 10 through the switch A, through both of the transformers T2 and T1 to the tap 12 and from the tap 12 through the switches B and C to the load line 11. Thus the voltage at the line 10 is applied to the output line 11 and in addition the voltage generated across the transformers T2 and T1 is added to that voltage to boost the voltage at the output line 11 by the total voltage generated across the transformers. In one example this can be 26 volts using as T1 and T2 transformers of the type 165V12 Hammond.

If the switches A, B, C and D are switched according to the following sequence:

| S | A | B | C | D |
|---|---|---|---|---|
| 0 | 0 | 0 | 0 | 0 |
| 1 | 0 | 1 | 0 | 0 |
| 2 | 0 | 1 | 1 | 0 |
| 3 | 0 | 0 | 1 | 1 |
| 4 | 1 | 0 | 0 | 1 |
| 5 | 1 | 1 | 0 | 0 |
| 6 | 1 | 1 | 1 | 0 |
| 7 | 1 | 1 | 1 | 1 |

Each state indicated by the above S causes the network of relay switches to move one step in the voltage modification generated across the transformers T1 and T2.

Thus for example in State 1 the switch B is energized so that instead of the current passing from the tap 12 it passes from the tap 13 through the switch B and the switch C to the load whereupon the voltage generated on the load side of the transformers is accordingly reduced by one quarter of 26 volts.

In State 4, the switch A is energized which acts as a polarity reversal switch so that the current passes to the upper side of the transformers T1 and T2 rather than the lower side whereby the transformers act to generate a voltage on the load side of the regulator which is subtracted from the nominal voltage transmitted from the input 10 to the output 11.

Careful study of the States 4, 5, 6 and 7 will show that the current passes through increasing steps of the transformers T1 and T2 thus generating steps in the voltage subtracted from the nominal voltage.

In State 4, the voltage at the input 10 is directly communicated through the switches A, B and C to the load and thus the load is nominally at the same voltage as the input line 10 apart from losses generated by the resistance across the contacts of the relay switches A, B and C.

The use of the relay switches in this manner produces a device which has a very low internal impedance, that is effectively the impedance generated across the contacts of the relay switches multiplied by the square of the transformer ratio. This enables the device to deliver large surge currents to motors and the like.

It will be noted from the States 0 through 7 that as far as possible only one relay is switched at each change of state although in some cases the maintenance of a particular relay in a particular state is not relevant to the required positions of the relays for that state. This technique reduces the number of switchings under load that are necessary.

Figure 2:
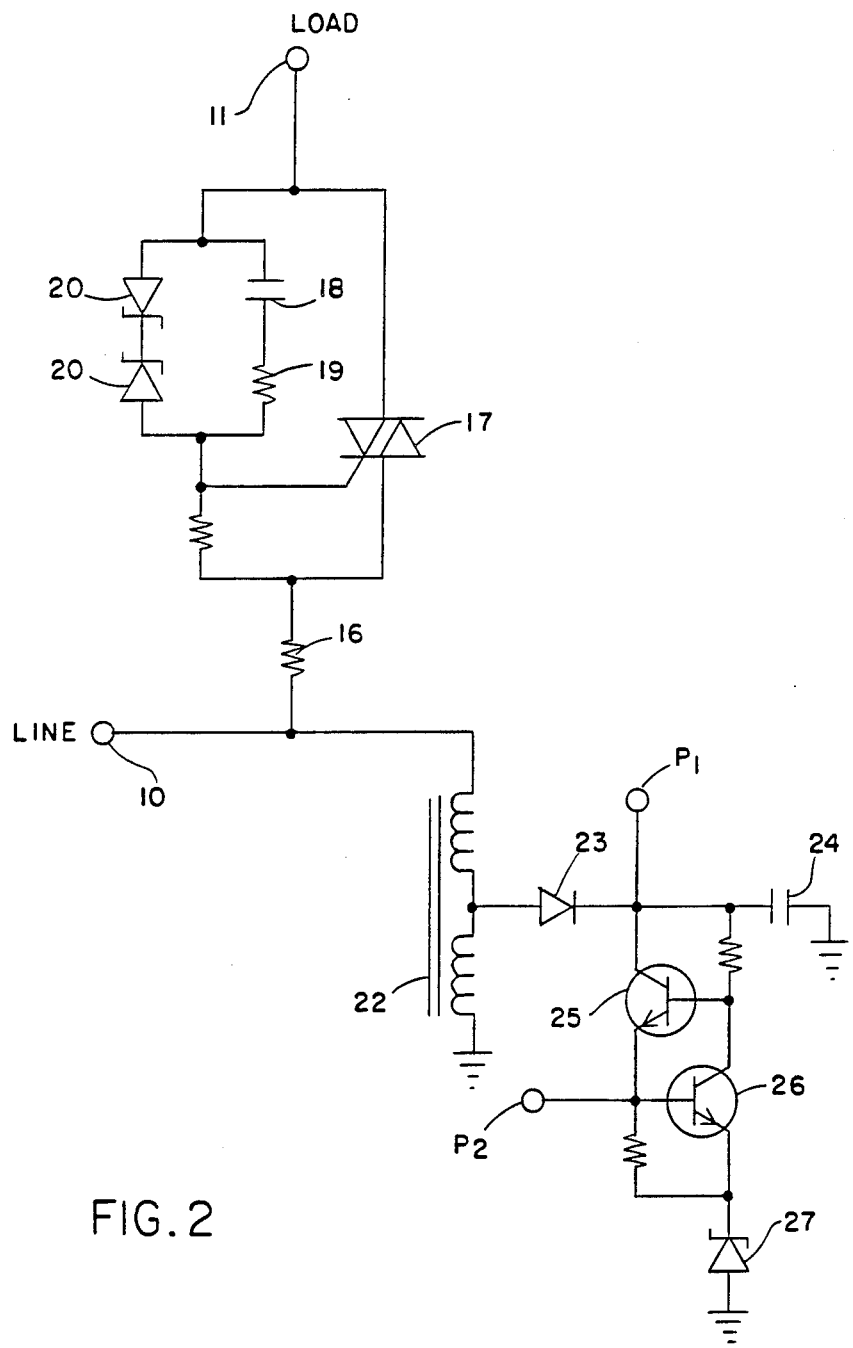
FIG. 2 is a schematic circuit illustration of a further portion of the voltage regulator showing particularly the transient suppression circuit and the circuit for generating a DC supply for the relay coils and a reference voltage.

It will of course be appreciated that during the switching process of each relay switch from one position to the next position that there is momentarily a break in the circuit from the input line 10 to the output line 11 thus providing the possibility of generating a transient in the otherwise smooth voltage transmission. A transient suppression circuit is illustrated in FIG. 2 and is connected directly from the input line 10 to the output line 11. The transient suppression circuit comprises a resistor 16 and a triac 17 so that when the triac is conducting, current can pass directly from the input line 10 through the resistor 16 to the output line 11. This maintains the current from the input line to the output line during the switching of the relays as previously described to avoid current transients and to reduce voltage transients. In addition it can act to protect the relay contacts.

The triac 17 is switched into conduction either by an increase in voltage difference between the line 10 and the line 11 at a rate greater than a predetermined maximum as determined by a capacitor 18 and resistor 19 or by generation of a voltage difference between the line 10 and the line 11 which exceeds a predetermined maximum as determined by a pair of zener diodes 20. It will be appreciated that either of these occurrences generates a current in the gate line 21 of the triac thus causing the triac t conduct as previously explained. When the gate line is de-energized, the triac continues to conduct until the current passing through the triac reaches zero that is the next zero line crossing point of the AC wave form.

Alternatively arrangements (not shown) can use a coupling circuit between the input line 10 and the output line 11 which includes an inductance. Such an inductance may be left in the circuit continuously but this is not as satisfactory as the above described arrangement in view of the fact that it can cause voltage spiking on break even though such voltage spiking can be partially suppressed using known techniques. A yet further alternative arrangement can use a capacitance in the transient circuit which again may be left in circuit but less satisfactory in view of the fact that it can cause impulse currents on relay switch make. These can of course also be partially suppressed. In a yet further arrangement the circuit may include a non-linear resistance which is also left in circuit but can generate large minimum voltage drop which degrades transient suppression and also does not protect the contacts.

The linear resistance described in the above arrangement is preferably switched by the triac in view of the fact that this is an economical arrangement which is fast On and slow Off to accommodate contact bounce on make. The linear resistance can also be switched on by a transistor arrangement which provides a fast On and Off reaction but has a disadvantage that it is significantly more expensive.

FIG. 2 also shows a DC power supply circuit for generating at a point 22 an unregulated 24 volt DC supply for driving the relay coils and at a point 23 a closely regulated reference voltage which may be 8.6 volts. The DC power supply is rectified by a diode 23 an a capacitor 24 as this is used merely to drive the relay coils and therefore can vary between a maximum of 30 volts and a minimum of 20 volts while still providing a specification voltage for the relays.

The 8.6 volt reference voltage is regulated much more accurately by transistors 25 and 26 together with a zener diode 27.

Figure 3:
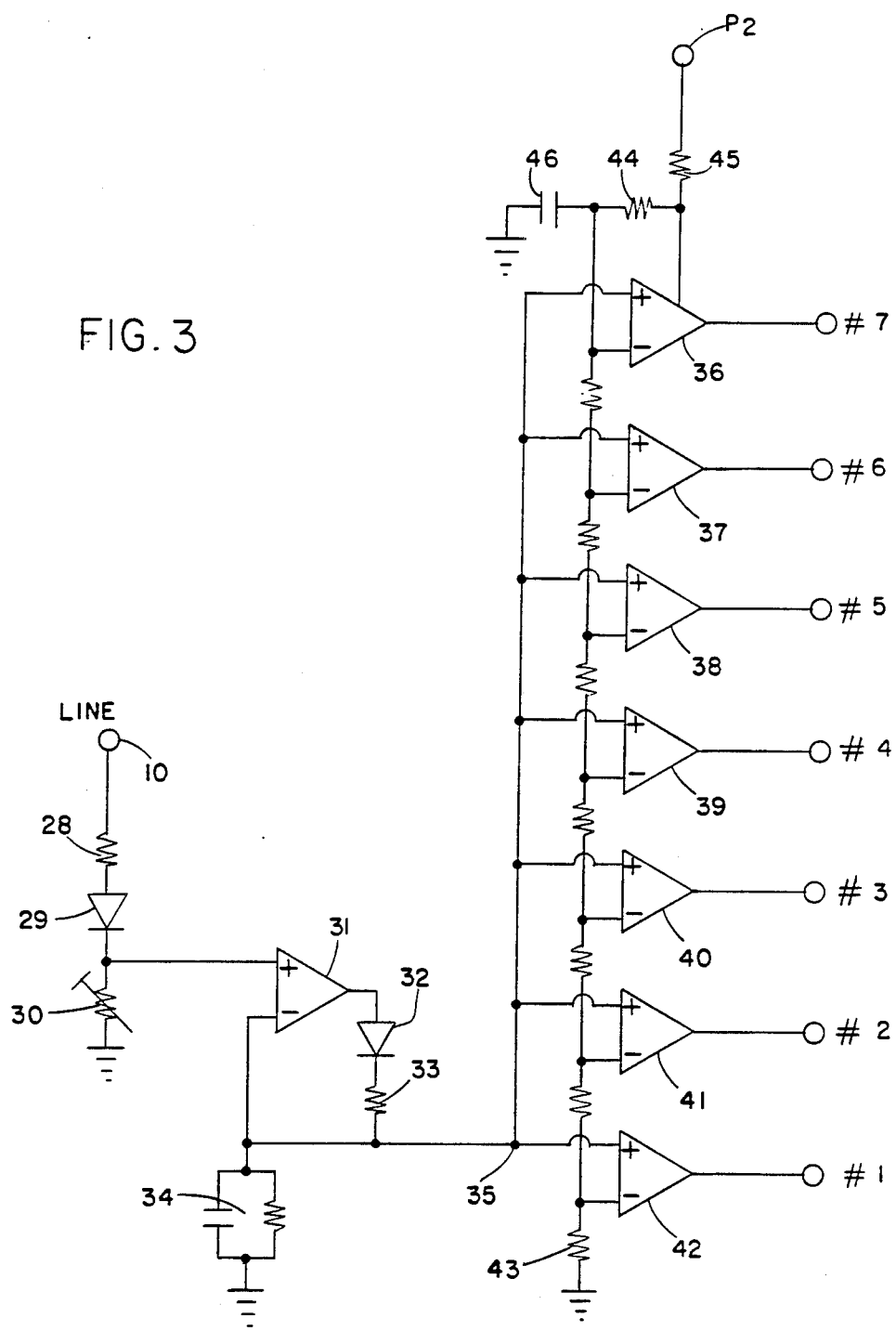
FIG. 3 is a schematic circuit illustration of a further portion of the voltage regulator and particularly the comparator circuit for generating output signals in the dependence upon the difference between a reference voltage and a voltage proportional to the line voltage.

Turning now to FIG. 3 there is shown a comparator circuit for generating output signals in dependence upon the difference between the line voltage on the input line indicated at 10 and the closely regulated reference voltage of 8.6 volts indicated at 23. The line voltage at 10 passes through a precision rectifier provided by a resistor 28, diode 29, variable resistor 30, differential amplifier 31, diode 32, resistor 33 and delay circuit 34. This generates a DC voltage at a terminal 35 which is closely proportional to the peak magnitude of the input line voltage at the terminal 10.

The comparator comprises a plurality of operational amplifiers 36 through 42 each of which has a non-inverting input, an inverting input and an output which goes high when the non-inverting input becomes more positive than the inverting input. The outputs are indicated as shown as #1 through #7. Each of the inverting terminals of the amplifiers 36 through 42 is connected in series with a resistor therebetween with the last being connected to ground through a final resistor 43. The inverting input of the amplifier 36 connected to the regulated supply at 23 through resistors 44 and 45. A capacitor 46 acts as a filter. The regulated voltage also acts to power the amplifiers through a line indicated at 47.

The proportional voltage at the terminal 35 is applied directly and in parallel to each of the positive terminals of the amplifiers 36 through 42.

Thus it will be appreciated that each amplifier compares the magnitude of the proportional voltage at the 35 to the voltage generated at the negative terminal thereof. The series connection of the inverting terminals therefore generates a voltage at the amplifier 42 inverting input which is lower than that at the amplifier 41 inverting input etc. with the largest voltage being generated at the amplifier 36. The amplifiers are biased to be held low in the initial state. Thus the output of amplifier 42 will become positive at #1 at a lowest voltage when the proportional voltage at 35 exceeds the voltage at the inverting terminal of that amplifier. Similarly the output of amplifier 41 will become positive at #2 when the proportional voltage exceeds the input voltage at that amplifier. The magnitude of the proportional voltage thus will cause one or more of the amplifiers become positive, strictly dependent upon the value of that proportional voltage and therefore of the value of the input line voltage.

Furthermore it will be noted that, when the amplifier 42 output becomes positive at #1, the current delivered by that output is drawn through resistor 45 and acts to reduce the voltage at the negative input of that amplifier so that when the proportional voltage at 35 is reduced it must reduce to a level lower than that level which was necessary to operate the amplifier 42. Thus each of the amplifiers 42 through 36 switches abruptly or "toggles" and is prevented from "sliding" or changing slowly in response to a slowly changing input.

Figure 4:
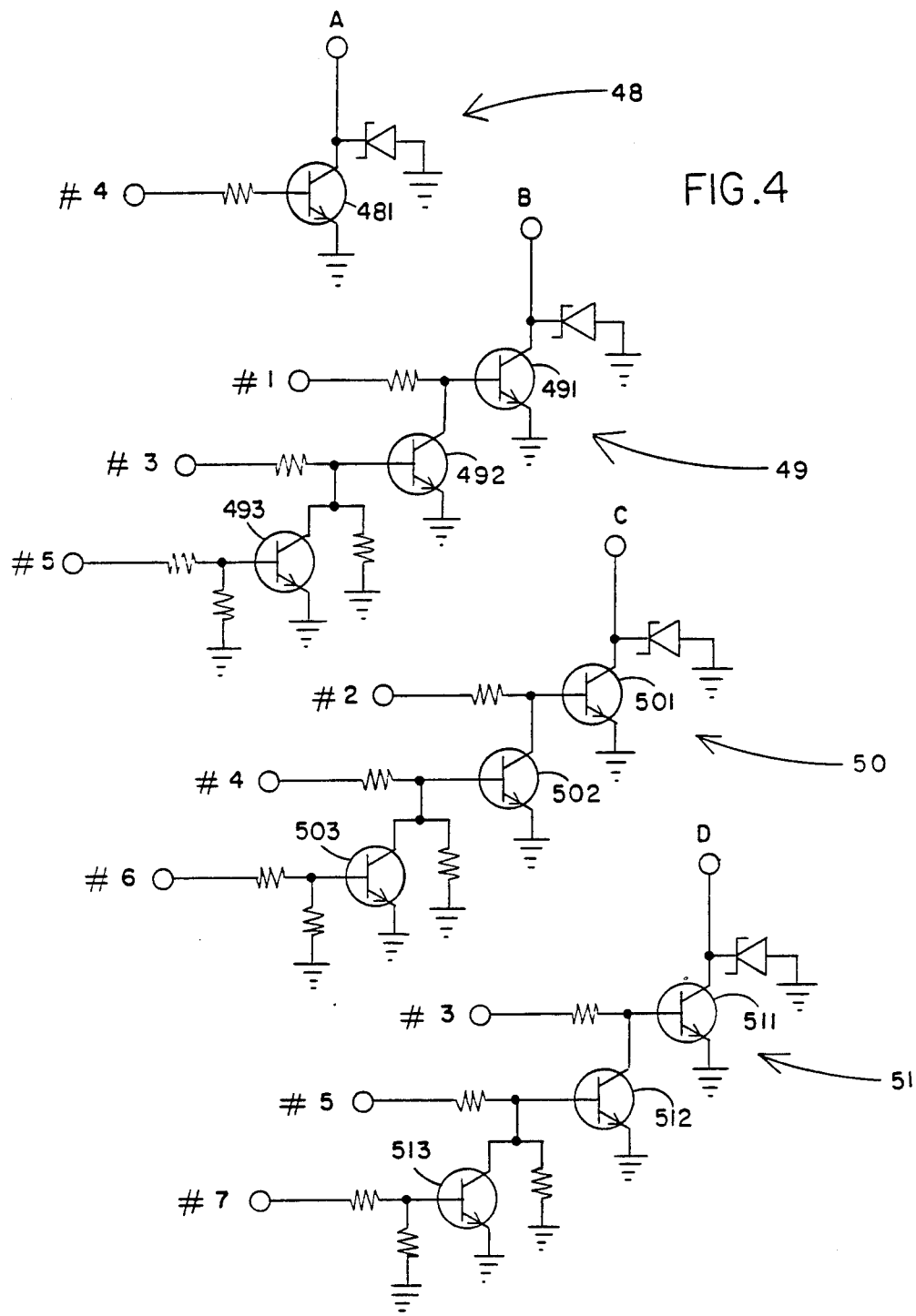
FIG. 4 is a schematic circuit illustration of a further part of the voltage regulator and particularly the logic circuit for actuating the relay network of FIG. 1 in dependence upon the outputs from the amplifiers of FIG. 3.

Turning now to FIG. 4 there is shown a logic circuit which employs the outputs #1 through #7 of FIG. 3 to operate the relays A, B, C and D of FIG. 1. The logic circuit operates to obtain the pattern of operation as set out in the Table hereinbefore. Thus the logic circuit comprises a number of separate portions indicated a 48, 49, 50 and 51 each acting to operate one of the relays A, B, C and D. The Table hereinbefore it will be noted that relay A is in an de-energized condition in States 0, 1, 2 and 3 and then is energized at State 4 and remains energized through to State 7. This is achieved simply by obtaining the output from #4 and using this output to supply base current to a transistor 481 thus generating a relay drive current at terminal A.

Turning to relay B, it will be noted that according to the Table it is energized in State 1 and this is obtained by the output from #1 passing to the base of a transistor 491 which generates a current at terminal B. Relay B then needs to be de-energized in State 3 and this is obtained by providing output #3 to the base of a transistor 492 which thus de-energizes the transistor 491 and removes the current from terminal B. Output #5 actuates a transistor 493 which in turn deenergizes transistor 492 and thus acts to re-energize transistor 491 whereupon the current at terminal B is re-applied in States 5, 6 and 7.

The same pattern of operation applies for relay C as indicated at terminal C in logic circuit 50 with the inputs to that circuit being provided by outputs #2, #4 and #6. The circuit employs transistors 501, 502 and 503 in a similar manner to those of logic circuit 49. Yet again the operation of relay D is controlled by voltage generated at the terminal D using inputs #3, #5 and #7 operating transistors 511, 512 and 513.

The present device as described above therefore provides a very low internal impedance consisting largely of the resistance in the relay contacts so as to allow large short term overloads. This low series impedance also makes practical a time delay obtained by the delay circuit 34 of FIG. 3 before switching the relays on changing of the load and this can very effectively extend relay life.

The separate relays as set out on FIG. 1 allow the regulator to switch from one state to any other state without passing step by step through the intervening states. This makes possible rapid correction on changing line voltage. The delay circuit 34 acts to slow the reactions on voltage decrease to avoid switching on, for example, motor start up.

The transient suppression provided has no effect on regulator performance except during and immediately after the actual switching stroke.

A further major feature of the regulator is the use of feed-forward means to control the switching. This gives a rather complex design problem but it greater simplifies the final circuit. This arrangement is well adapted to step-like output voltage change. The regulator control is nearly independent of the output, deriving all power and signals directly from the input. This largely prevents fast-cycling the load if something goes wrong.

In an alternative arrangement (not shown) a circuit of this general type can be used to regulate a 240 volt system in which a neutral wire is not required by providing a simplified form of the relay network between the input red wire and the red wire of the load and between the input black wire and the black wire of the load. In this case there may be provided for each half of the circuit only a single transformer having two taps selected by a single relay. A single polarity reversal relay switch is also employed in each half in the manner of the relay A as previously described. The steps in each half take place alternately and therefore each step may be about twice the size of those employed in the arrangement hereinabove described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An AC voltage regulator comprising means for connection to an input line, means for connection to an output line, a transformer arrangement for generating an AC voltage on said output line which can differ from a voltage on said input line, said transformer arrangement having a plurality of taps which are selectable to change said voltage, means for sensing the magnitude of the voltage of the input line, switching means for selecting and for switching into contact one of said taps in dependence upon said sensed magnitude so as to tend to maintain the voltage on said output line within predetermined limits while said voltage on said input line varies, said switching means being arranged such that for a time period during switching none of said taps is contacted, and means providing said switching means and said transformer arrangement to maintain a current path and thus power to said output line during said switching.

2. The invention according to claim 1 wherein said circuit connection means includes means for making and breaking said circuit connection such that said circuit connection is made during switching of said switching means and is broken after said switching means has completed switching.

3. The invention according to claim 2 wherein said circuit connection means includes rate of change detecting means for detecting a magnitude of rate of change of voltage difference between said input line and output line greater than a predetermined maximum and amplitude detecting means for detecting a magnitude of difference of voltage between said input line and said output line greater that a predetermined maximum and wherein said circuit connection means is actuable in dependence upon said amplitude detecting means and said rate of change detecting means.

4. The invention according to claim 3 wherein said circuit connection means comprises a triac.

5. The invention according to claim 3 wherein said amplitude detecting means comprises a pair of zener diodes.

6. The invention according to claim 1 wherein said switching means includes a relay actuated polarity reversal switch arranged such that a voltage generated by said transformer arrangement at said output line can be in a first position of the switch added to and in a second position of the switch subtracted from a nominal voltage at said output line generated from said input line.

7. The invention according to claim 1 wherein said switching means includes a first relay actuated switch having a first terminal connected to a first tap and a second terminal connected to a second tap, a second relay actuated switching having a first terminal connected to a third tap and a second terminal connected to a fourth tap and a third relay actuated switch having a first terminal connected to said first switch and a second terminal connected to said second switch whereby selected actuation of said first, second and third switches is arranged to select one of said first, second, third and fourth taps.

8. The invention according to claim 7 wherein each of said first, second and third relay actuated switches comprises a double throw switch having a first terminal and a second terminal for selecting said taps.

9. The invention according to claim 1 wherein said sensing means comprises a plurality of op-amps each having a first input terminal and a second input terminal and each arranged to produce an output voltage when a voltage at said second input terminal exceeds the voltage at said first input terminal, means for generating a reference voltage, means for connecting said reference voltage to said first input terminals in series, resistor means between each first input terminals and the next adjacent first input terminal such that the voltage at each first input terminal in turn is decreased relative to the next previous first input terminal, means for generating a voltage proportional to said voltage on said input line, means for applying said proportional voltage to each of said second input terminals and logic circuit means for actuating selected ones of said delay actuated switching means in dependence upon the output voltages from said op-amps.

10. The invention according to claim 9 wherein means for applying said reference voltage is arranged such that generation of an output voltage by each of said op-amps causes a reduction in voltage at the first terminal of the respective op-amp.

11. An AC voltage regulator comprising means for connection to an input line, means for connection to an output line, a transformer arrangement for generating a voltage on said output line which can differ from a voltage on said input line, said transformer arrangement having a plurality of taps, relay switching means including a relay actuated polarity reversal switch arranged such that a voltage generated by said transformer arrangement at said output line can be in a first position of the switch added to and in a second position of the switch subtracted from a nominal voltage at said output line generated from said input line, a first relay actuated switch having a first terminal thereof connected to a first tap and a second terminal thereof connected to a second tap, a second relay actuated switch having a first terminal thereof connected to a third tap and a second terminal thereof connected to a fourth tap, a third relay actuated switch having a first terminal connected to said first switch and a second terminal connected to said second switch whereby selected actuation of said first, second and third switches is arranged to select one of said first, second, third and fourth taps, means for sensing a magnitude of a voltage and for actuating said relay actuated switches in dependence upon said sensed magnitude so as to tend to maintain said output voltage within predetermined limits while said input voltage varies, and means providing a circuit connection between said input and output lines by-passing said relay actuated switches and said transformer arrangement so as to maintain a current path and thus power to said output line during said switch actuation.

12. The invention according to claim 11 wherein said circuit connection means includes means for making and breaking said circuit connection such that said circuit connection is made during actuation of said relay actuated switches and is broken after said relay actuated switches have completed switching.

13. The invention according to claim 11 wherein said circuit connection means includes first detecting means for detecting a rate of change of voltage difference between said input line and output line greater than a predetermined maximum and a second detecting means for detecting a difference in voltage between said input line and said output line greater than a predetermined maximum and wherein said circuit connection means is actuable in dependence upon said first and second detecting means.

14. The invention according to claim 13 wherein said circuit connection means comprises a triac.

15. The invention according to claim 13 wherein said second detecting means comprises a pair of zener diodes.

16. An AC voltage regulator comprising means for connection to an input line, means for connection to an output line, a transformer arrangement for generating a voltage on said output line which can differ from a voltage on said input line, said transformer arrangement having a plurality of taps, relay switching means including a relay actuated polarity reversal arrangement at said output line can be in a first position of the switch added to and in a second position of the switch subtracted from a nominal voltage at said output line generated from said input line, a first relay actuated switch having a first terminal thereof connected to a first tap and a second terminal thereof connected to a second tap, a second relay actuated switch having a first terminal thereof connected to a third tap and a second terminal thereof connected to a fourth tap, a third relay actuated switch having a first terminal connected to said first switch and a second terminal connected to said second switch whereby selected actuation of said first, second and third switches is arranged to select one of said first, second, third and fourth taps, means for sensing a magnitude of a voltage and for actuating said relay actuated switches in dependence upon said sensed magnitude so as to tend to maintain said output voltage within predetermined limits while said input voltage varies, and means providing a circuit connection between said input and output lines by-passing said relay actuated switches and said transformer arrangement so as to maintain a current path and thus power to said output line during said switch actuation wherein said sensing means comprises a plurality of op-amps each having a first input terminal and a second input terminal and each arranged to produce an output voltage when a voltage at said second input terminal exceeds the voltage at said first input terminal, means for generating a reference voltage, means for connecting said reference voltage to said first input terminals in series, resistor means between each first input terminals and the next adjacent first input terminal such that the voltage at each first input terminal in turn is decreased relative to the next previous first input terminal, means for generating a voltage proportional to said voltage on said input line, means for applying said proportional voltage to each of said second input terminals and logic circuit means for actuating selected ones of said switching means in dependence upon the output voltages from said op-amps, and wherein said means for applying said reference voltage is arranged such that generation of an output voltage by each of said op-amps causes a reduction in voltage at the first terminal of the respective op-amp.

17. An AC voltage regulator comprising means for connection to an input line, means for connection to an output line, a transformer arrangement for generating an AC voltage on said output line which can differ from a voltage on said input line, said transformer arrangement having a plurality of taps which are selectable to change said voltage, means for sensing the magnitude of the voltage of the input line, switching means for selecting and for switching into contact one of said taps in dependence upon said sensed magnitude so as to tend to maintain the voltage on said output line within predetermined limits while said voltage on said input line varies, said switching means being arranged such that for a time period during switching none of said taps is contacted, and means providing a circuit connection between said input and output line by-passing said switching means and said transformer arrangement to maintain a current path and thus power to said output line during said switching, said circuit connection means including switch means arranged to normally maintain said circuit connection open said switch means having means responsive to said condition in which none of said taps is contacted to close said circuit connection and to reopen said circuit connection after a further tap is contacted.

18. An AC voltage regulator comprising means for connection to an input line, means for connection to an output line, a transformer arrangement for generating an AC voltage on said output line which can differ from a voltage on said input line, said transformer arrangement having a plurality of taps which are selectable to change said voltage, means for sensing the magnitude of the voltage of the input line, switching means for selecting and for switching into contact one of said taps in dependence upon said sensed magnitude so as to tend to maintain the voltage on said output line within predetermined limits while said voltage on said input line varies, said switching means being arranged such that for a time period during switching none of said taps is contacted, and means providing a circuit connection between said input and output line by-passing said switching means and said transformer arrangement to maintain a current path and thus power to said output line during said switching, said circuit connection means including switch means arranged to normally maintain said circuit connection open, said switch means having detection means responsive to a voltage difference between said input line and said output line of either polarity greater than a predetermined maximum value and responsive to a rate of change of voltage difference thereacross of either polarity greater than a predetermined maximum value and said switch means being operable in dependence upon said detection means to close said circuit connection and to reopen said circuit connection when a further tap is contacted.

* * * * *